(12) United States Patent
van Schaik (10) Patent No.: US 9,075,789 B2
(45) Date of Patent: Jul. 7, 2015

(54) METHODS AND APPARATUS FOR INTERLEAVING PRIORITIES OF A PLURALITY OF VIRTUAL PROCESSORS

(71) Applicant: General Dynamics C4 Systems, Inc., Scottsdale, AZ (US)

(72) Inventor: Carl Frans van Schaik, Kingsford (AU)

(73) Assignee: General Dynamics C4 Systems, Inc., Scottsdale, AR (US)

( * ) Notice: Subject to any disclaimer, the term of this patent is extended or adjusted under 35 U.S.C. 154(b) by 386 days.

(21) Appl. No.: 13/710,891

(22) Filed: Dec. 11, 2012

(65) Prior Publication Data

US 2014/0164662 A1    Jun. 12, 2014

(51) Int. Cl.
- G06F 13/26 (2006.01)
- G06F 13/24 (2006.01)
- G06F 13/34 (2006.01)
- G06F 9/48 (2006.01)

(52) U.S. Cl.
CPC ............... *G06F 13/26* (2013.01); *G06F 13/24* (2013.01); *G06F 13/34* (2013.01); *G06F 9/4812* (2013.01); *G06F 9/4818* (2013.01)

(58) Field of Classification Search
CPC ..... G06F 9/5038; G06F 9/5077; G06F 9/526; G06F 2209/506
USPC .................... 710/260–269, 240–244; 711/150
See application file for complete search history.

(56) References Cited

U.S. PATENT DOCUMENTS

| | | | |
|---|---|---|---|
| 7,590,982 B1 * | 9/2009 | Weissman | 718/1 |
| 7,707,578 B1 * | 4/2010 | Zedlewski et al. | 718/102 |
| 7,831,980 B2 * | 11/2010 | Accapadi et al. | 718/108 |
| 2003/0126187 A1 | 7/2003 | Won et al. | |
| 2004/0162964 A1 | 8/2004 | Ota et al. | |
| 2005/0086661 A1 | 4/2005 | Monnie et al. | |
| 2005/0154861 A1 * | 7/2005 | Arimilli et al. | 712/216 |
| 2006/0117325 A1 * | 6/2006 | Wieland et al. | 719/321 |
| 2006/0130062 A1 * | 6/2006 | Burdick et al. | 718/100 |
| 2006/0174053 A1 | 8/2006 | Anderson et al. | |
| 2007/0094659 A1 | 4/2007 | Singh et al. | |
| 2007/0226449 A1 | 9/2007 | Akimoto | |
| 2007/0250669 A1 | 10/2007 | Arimilli et al. | |
| 2007/0300218 A1 * | 12/2007 | Mann | 718/1 |
| 2008/0016315 A1 | 1/2008 | Cohen et al. | |
| 2008/0059556 A1 | 3/2008 | Greenspan et al. | |
| 2008/0072238 A1 | 3/2008 | Monnie et al. | |
| 2008/0126820 A1 | 5/2008 | Fraser et al. | |

(Continued)

*Primary Examiner* — Tim T Vo
*Assistant Examiner* — Jasper J Harris
(74) *Attorney, Agent, or Firm* — Ingrassia, Fisher & Lorenz, P.C.

(57) ABSTRACT

Methods and apparatus for interleaving priorities of a plurality of virtual processors are disclosed. A hypervisor assigns a base priority to each virtual processor and schedules one or more virtual processors to execute on one or more physical processors based on the current priority associated with each virtual processor. When the hypervisor receives an indication from one of the virtual processors that its current priority may be temporarily reduced, the hypervisor lowers the current priority of that virtual processor. The hypervisor then schedules another virtual processor to execute on a physical processor instead of the virtual processor with the temporarily reduced priority. When the hypervisor receives an interrupt for the virtual processor with the lowered priority, the hypervisor raises the priority of that virtual processor and schedules the virtual processor with the restored priority to execute on a physical processor so that processor can handle the interrupt.

21 Claims, 7 Drawing Sheets

(56) References Cited

U.S. PATENT DOCUMENTS

| | | | |
|---|---|---|---|
| 2008/0141277 A1* | 6/2008 | Traut et al. | 719/313 |
| 2008/0183944 A1 | 7/2008 | Thornton et al. | |
| 2009/0006805 A1 | 1/2009 | Anderson et al. | |
| 2010/0023666 A1* | 1/2010 | Mansell et al. | 710/267 |
| 2010/0138828 A1* | 6/2010 | Hanquez et al. | 718/1 |
| 2010/0217868 A1* | 8/2010 | Heller, Jr. | 709/226 |
| 2010/0229173 A1* | 9/2010 | Subrahmanyam et al. | 718/103 |
| 2010/0262742 A1* | 10/2010 | Wolfe | 710/265 |
| 2010/0325454 A1 | 12/2010 | Parthasarathy | |
| 2011/0016290 A1 | 1/2011 | Chobotaro et al. | |
| 2011/0023029 A1 | 1/2011 | Diab et al. | |
| 2011/0047546 A1 | 2/2011 | Kivity et al. | |
| 2011/0072427 A1 | 3/2011 | Garmark | |
| 2011/0083132 A1* | 4/2011 | Laor et al. | 718/1 |
| 2011/0119667 A1 | 5/2011 | Srinivasan | |
| 2011/0197003 A1* | 8/2011 | Serebrin et al. | 710/267 |
| 2011/0197188 A1 | 8/2011 | Srinivasan et al. | |
| 2011/0225459 A1 | 9/2011 | Fahrig et al. | |
| 2011/0225591 A1 | 9/2011 | Wada et al. | |
| 2011/0231630 A1 | 9/2011 | Dannowski et al. | |
| 2011/0296406 A1* | 12/2011 | Bhandari et al. | 718/1 |
| 2011/0296407 A1 | 12/2011 | Bhandari et al. | |
| 2011/0307888 A1 | 12/2011 | Raj et al. | |
| 2012/0096458 A1 | 4/2012 | Huang et al. | |
| 2012/0122573 A1 | 5/2012 | Ha et al. | |
| 2012/0151481 A1 | 6/2012 | Kang et al. | |
| 2012/0216193 A1 | 8/2012 | Lee et al. | |
| 2012/0222027 A1 | 8/2012 | Tsirkin | |
| 2012/0233282 A1 | 9/2012 | Voccio et al. | |
| 2012/0272235 A1 | 10/2012 | Fahrig | |
| 2012/0304173 A1 | 11/2012 | Garmark | |
| 2013/0042084 A1 | 2/2013 | Austruy et al. | |
| 2013/0097602 A1 | 4/2013 | Hanquez et al. | |
| 2013/0268933 A1 | 10/2013 | Bhandari et al. | |

* cited by examiner

METHODS AND APPARATUS FOR INTERLEAVING PRIORITIES OF A PLURALITY OF VIRTUAL PROCESSORS

The present disclosure relates in general to virtual machines, and, in particular, to methods and apparatus for interleaving priorities of a plurality of virtual processors.

BACKGROUND

A hypervisor is a software interface between the physical hardware of a computing device, such as a wireless telephone or vehicle user interface system, and multiple operating systems. Each operating system managed by the hypervisor is associated with a different virtual machine, and each operating system appears to have exclusive access to the underlying hardware, such as processors, user interface devices, and memory. However, the hardware is a shared resource, and the hypervisor controls all hardware access (e.g., via prioritized time sharing).

In order to give each virtual machine the appearance of exclusive access to one or more physical processors, the hypervisor schedules one or more virtual processors to execute on one or more physical processors based on a priority associated with each virtual processor. In one example, if two virtual processors are sharing one physical processor, where one of the virtual processors has a priority level that is twice as high as the other virtual processor; the hypervisor may schedule the higher priority virtual processor to execute on the physical processor twice as often as the lower priority virtual processor. In another example, if one virtual processor has a higher priority than another virtual processor, and both virtual processors are available to run, then the hypervisor may schedule the virtual processor with the higher priority to execute on the physical processor every time. This strict-priority based scheduling supports real-time processing.

However, each virtual processor may be executing a plurality of different threads. Some of these threads may be more time critical than others. As a result, threads within a virtual processor only execute when the virtual processor is scheduled, and their thread-priorities are not considered. This may lead to scheduling low priority threads on a high priority virtual processor in preference to high priority threads on a medium priority virtual processor.

DETAILED DESCRIPTION OF THE PREFERRED EMBODIMENTS

Briefly, methods and apparatus for interleaving priorities of a plurality of virtual processors are disclosed. In an embodiment, a hypervisor assigns a base priority to each virtual processor and schedules one or more virtual processors to execute on one or more physical processors based on the current priority associated with each virtual processor. When the hypervisor receives an indication from one of the virtual processors that its current priority may be temporarily reduced, the hypervisor lowers the current priority of that virtual processor. The hypervisor may then schedule another virtual processor to execute on the physical processor instead of the virtual processor with the temporarily reduced priority. When the hypervisor receives an interrupt for the virtual processor with the lowered priority, the hypervisor raises the priority of that virtual processor and schedules the virtual processor based on the restored priority. This may cause the virtual processor to immediately execute on a physical processor so the virtual processor can handle the interrupt with reduced latency and at the virtual processor's base priority level. Among other features, the methods and apparatus disclosed herein facilitate interleaving priorities of threads within virtual processors despite the fact that the hypervisor is unaware of individual threads and the priorities associated with individual threads.

Figure 1:
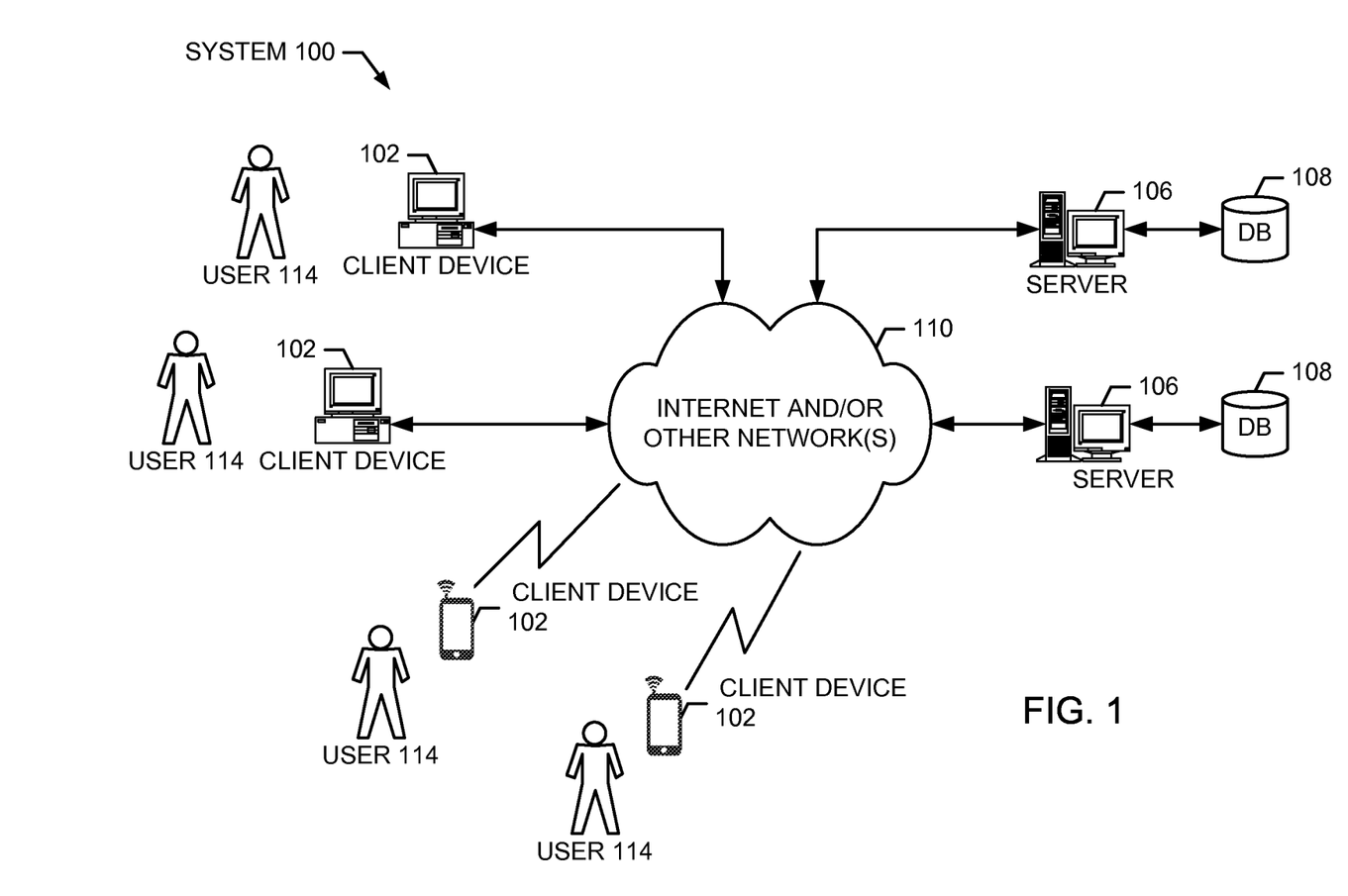
FIG. 1 is a block diagram of an example network communication system.

The present system may be used in a network communications system. A block diagram of certain elements of an example network communications system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, fewer low power microprocessors, and a single network connection.

Figure 2:
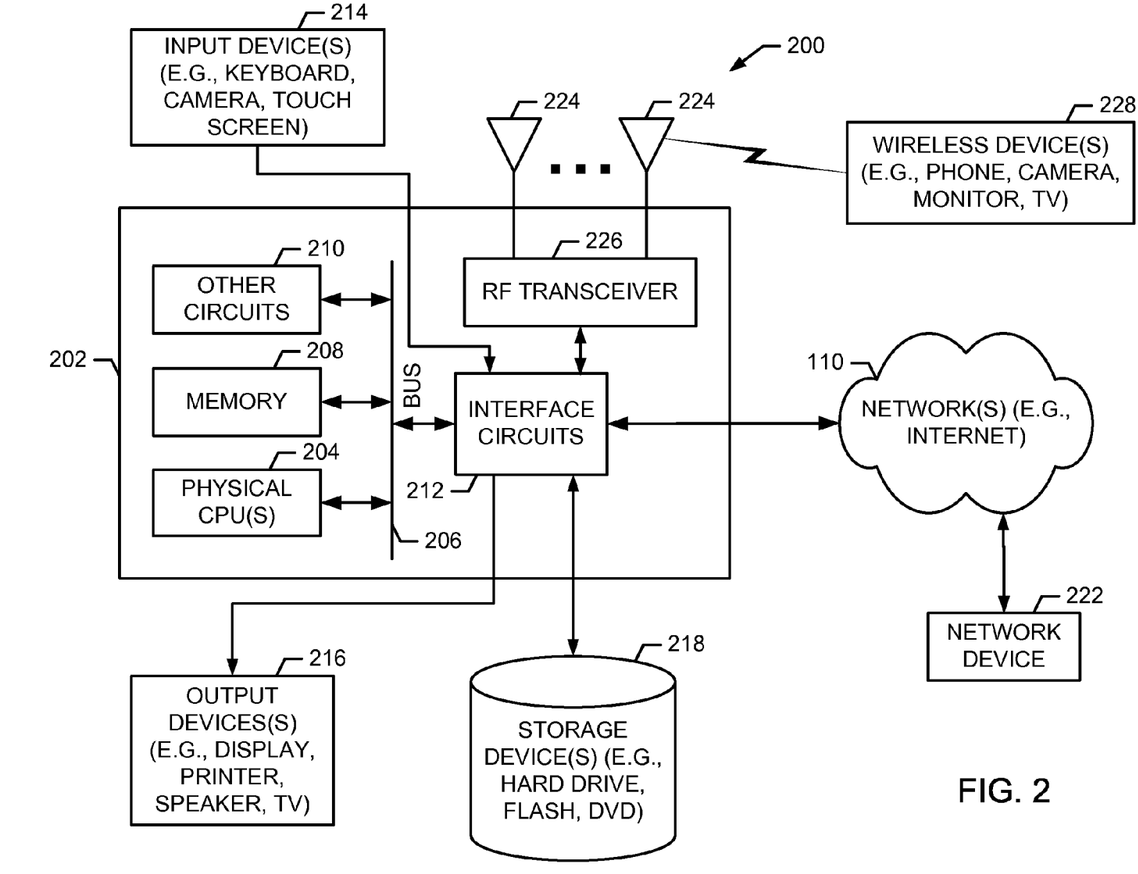
FIG. 2 is a block diagram of an example electronic device.

Each of the devices illustrated in FIG. 1 may include certain common aspects of many electronic devices such as microprocessors, memories, peripherals, etc. A block diagram of certain elements of an example electronic device 200 that may be used to capture, store, and/or playback digital video is illustrated in FIG. 2. For example, the electrical device 200 may be a client, a server, a camera, a phone, and/or a television.

The example electrical device 200 includes a main unit 202 which may include, if desired, one or more physical processors 204 electrically coupled by an address/data bus 206 to one or more memories 208, other computer circuitry 210, and one or more interface circuits 212. The processor 204 may be any suitable processor or plurality of processors. For example, the electrical device 200 may include a central processing unit (CPU) and/or a graphics processing unit (GPU). The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processor 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, isopoint, camera and/or a voice recognition system.

One or more displays, printers, speakers, monitors, televisions, high definition televisions, and/or other suitable output devices 216 may also be connected to the main unit 202 via the interface circuit 212. The display 216 may be a cathode ray tube (CRTs), liquid crystal displays (LCDs), or any other type of suitable display. The display 216 generates visual displays of data generated during operation of the device 200. For example, the display 216 may be used to display web pages and/or other content received from a server. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the device 200.

The electrical device 200 may also exchange data with other network devices 222 via a connection to a network. The network connection may be any type of network connection, such as an Ethernet connection, digital subscriber line (DSL), telephone line, coaxial cable, etc. Users of the system may be required to register with a server. In such an instance, each user may choose a user identifier (e.g., e-mail address) and a password which may be required for the activation of services. The user identifier and password may be passed across the network using encryption built into the user's browser. Alternatively, the user identifier and/or password may be assigned by the server.

In some embodiments, the device 200 may be a wireless device. In such an instance, the device 200 may include one or more antennas 224 connected to one or more radio frequency (RF) transceivers 226. The transceiver 226 may include one or more receivers and one or more transmitters. For example, the transceiver 226 may be a cellular transceiver. The transceiver 226 allows the device 200 to exchange signals, such as voice, video and data, with other wireless devices 228, such as a phone, camera, monitor, television, and/or high definition television. For example, the device may send and receive wireless telephone signals, text messages, audio signals and/or video signals.

Figure 3:
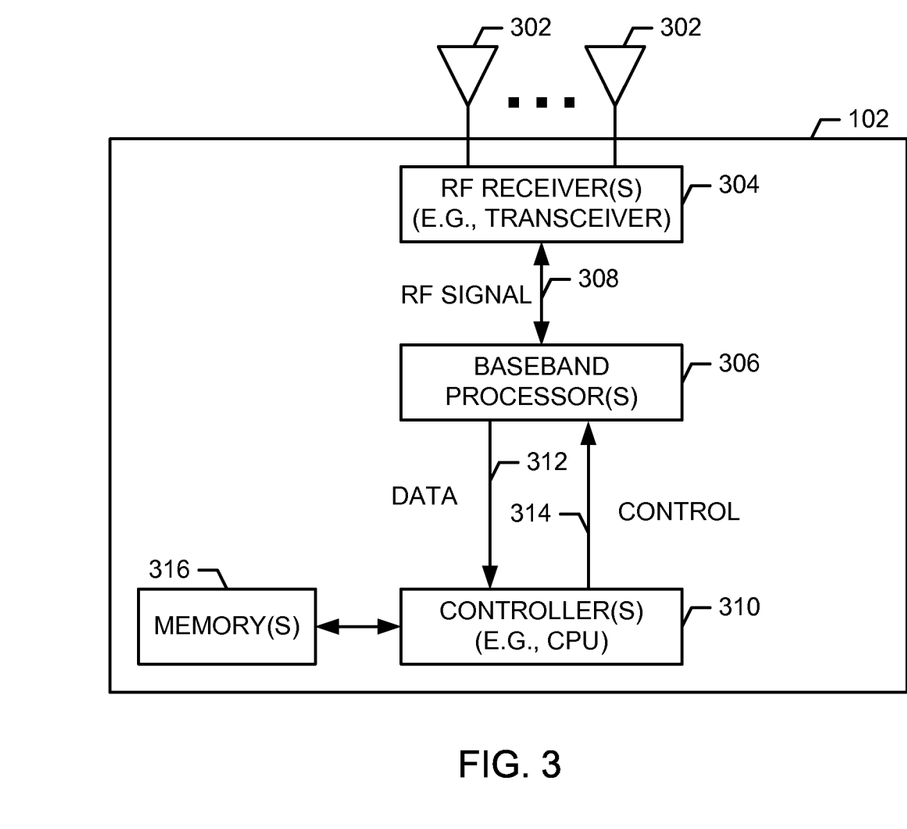
FIG. 3 is a block diagram of another example electronic device.

A block diagram of certain elements of an example wireless device 102 for sharing memory between multiple processes of a virtual machine is illustrated in FIG. 3. The wireless device 102 may be implemented in hardware or a combination of hardware and hardware executing software. In one embodiment, the wireless device 102 may include a CPU executing software. Other suitable hardware may include one or more application specific integrated circuits (ASICs), state machines, field programmable gate arrays (FPGAs), and/or digital signal processors (DSPs).

In this example, the wireless device 102 includes a plurality of antennas 302 operatively coupled to one or more radio frequency (RF) receivers 304. The receiver 304 is also operatively coupled to one or more baseband processors 306. The receiver 304 tunes to one or more radio frequencies to receive one or more radio signals 308, which are passed to the baseband processor 306 in a well known manner. The baseband processor 306 is operatively coupled to one or more controllers 310. The baseband processor 306 passes data 312 to the controller 310. A memory 316 operatively coupled to the controller 310 may store the data 312.

Figure 4:
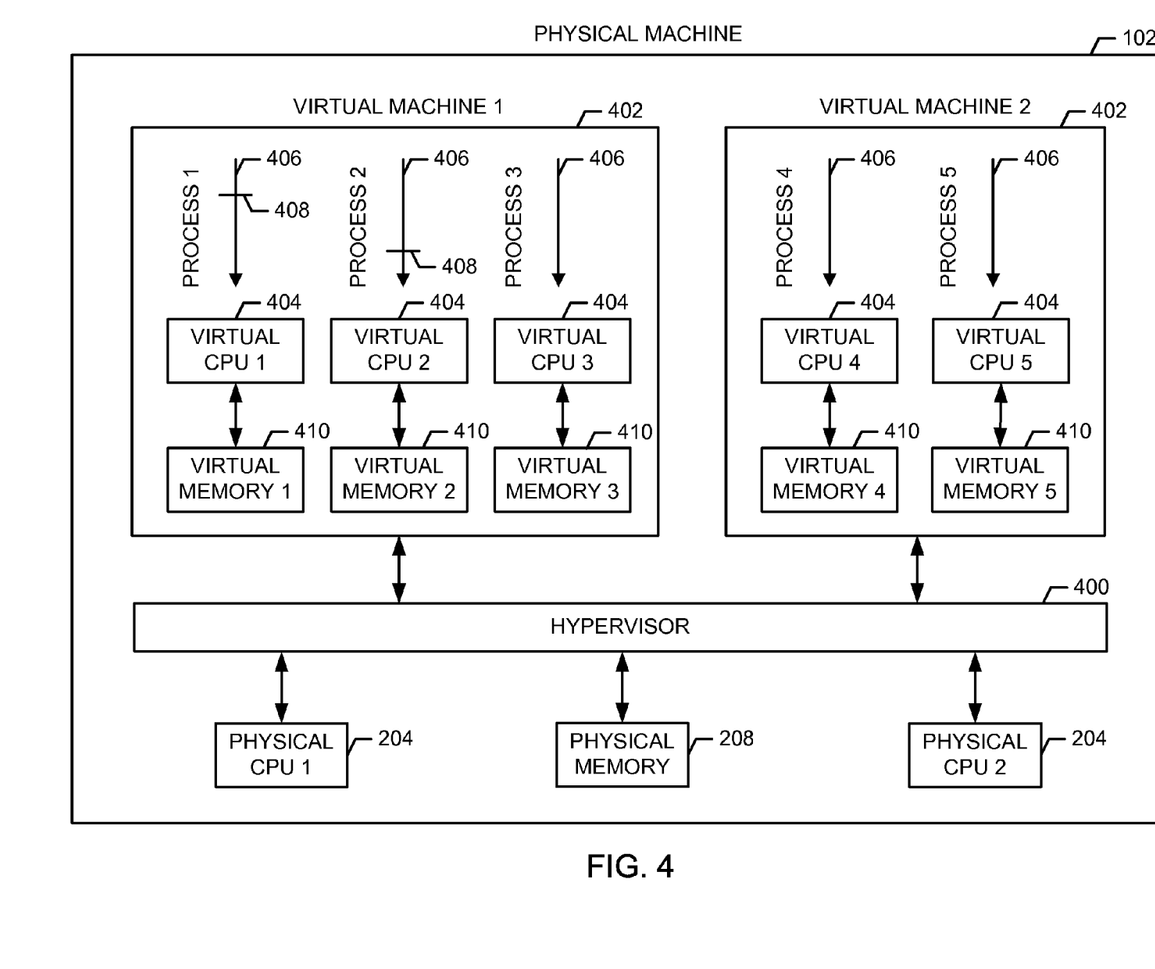
FIG. 4 is a block diagram of yet another example electronic device.

A block diagram of certain elements of yet another example electronic device is illustrated in FIG. 4. In this example, a physical machine 102 includes two physical processors 204. However, any suitable number of physical processors 204 may be included in the physical machine 102. For example, the physical machine 102 may include a multi-core central processing unit with four or more cores. The physical machine 102 also includes one or more physical memories 208 for use by the physical processors 204. For example, the physical machine 102 may include dynamic random access memory (DRAM).

A plurality of virtual machines 402 execute within the physical machine 102. Each virtual machine 402 is a software implementation of a computer and the operating system associated with that computer. Different virtual machines 402 within the same physical machine 102 may use different operating systems. For example, a mobile communication device may include three virtual machines 402 where two of the virtual machines 402 are executing the Android operating system and one of the virtual machines 402 is executing a different Linux operating system.

Each virtual machine 402 includes one or more virtual processors 404 and associated virtual memory 410. Each virtual processor 404 executes one or more processes 406 using one or more of the physical processors 204. Similarly, the contents of each virtual memory 410 are stored in the physical memory 208.

A hypervisor 400 controls access by the virtual machines 402 to the physical processors 204 and the physical memory 208. More specifically, the hypervisor 400 schedules each virtual processor 404 to execute one or more processes 406 on one or more physical processors 204 according to the relative priorities associated with the virtual machines 402. Once the hypervisor 400 schedules a process 406 to execute on a physical processor 204, the process 406 typically advances to a progress point 408 unless suspended by the hypervisor 400.

Each virtual processor 404 typically executes a plurality of different processes and/or threads within one or more processes. Some of these threads are time critical in nature (e.g., sending and receiving wireless data). Other threads are less time critical (e.g., decoding audio), and some threads are not time critical at all (e.g., miscellaneous memory clean up). Accordingly, using the methods and apparatus described herein, priorities of different threads can be interleaved, even when the threads are run on different virtual processors.

Figure 5:
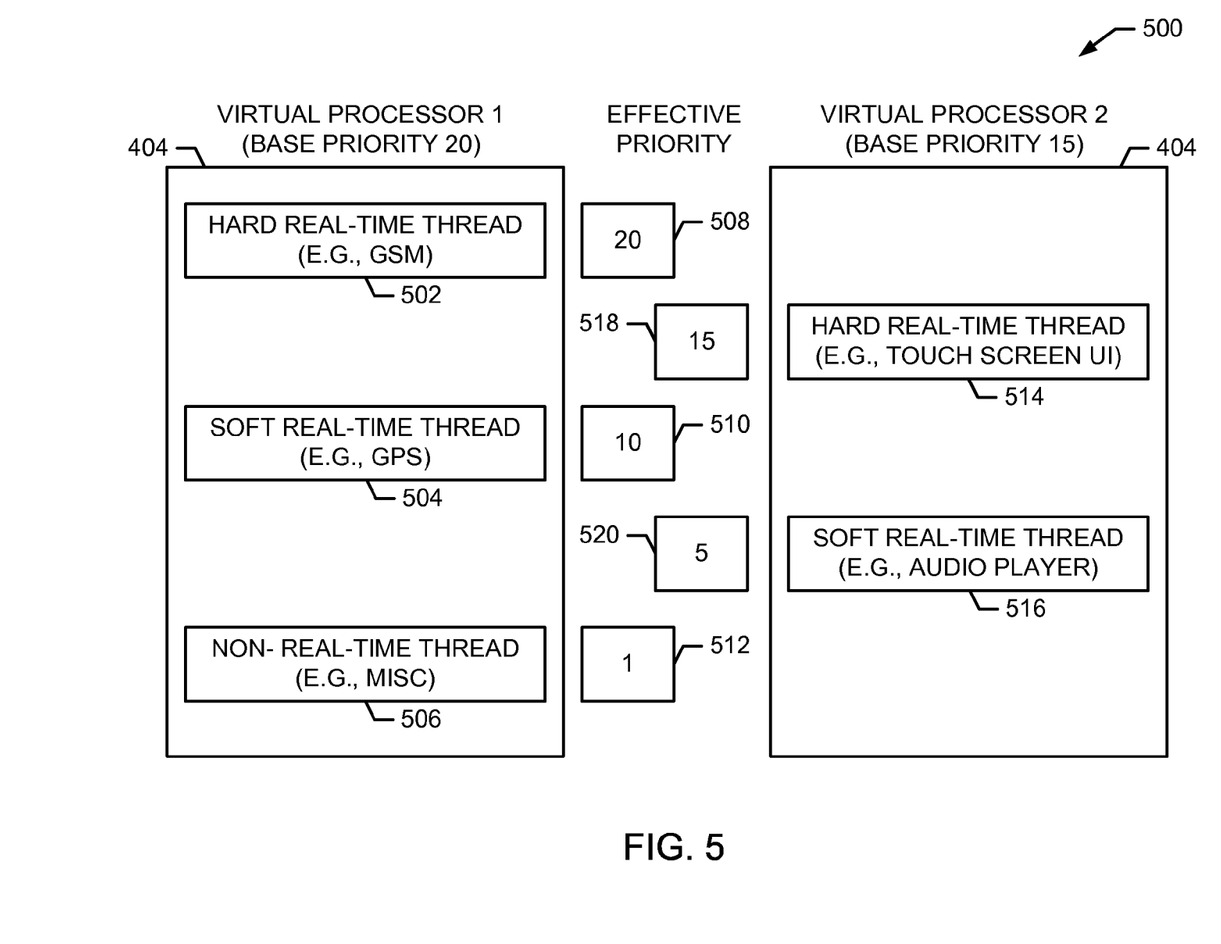
FIG. 5 is a block diagram showing one example of how priorities of a plurality of virtual processors may be interleaved.

A block diagram showing one example of how priorities of a plurality of virtual processors may be interleaved is illustrated in FIG. 5. In this example, a first virtual processor 404 is assigned a base priority of 20, and a second virtual processor 404 is assigned a base priority of 15. In general, the first virtual processor 404 has a higher priority than the second virtual processor 404. Accordingly, scheduling the first virtual processor 404 on a physical processor 204 typically takes precedence over scheduling the second virtual processor 404 on a physical processor 204.

In this example, the first virtual processor 404 includes a hard real-time thread 502, a soft real-time thread 504, and a non-real-time thread 506. For example, the hard real-time thread 502 may be a time-critical thread such as sending and receiving Global System for Mobile Communications (GSM) data. If this thread 502 is not executed above some threshold frequency, users may experience dropped calls and/or a loss of data. Accordingly, the first virtual processor 404 is given high priority (e.g., 20) to support this requirement. In addition, using the methods and apparatus for interleaving priorities described herein, the hard real-time thread 502 is also given a high effective priority 508 (e.g., 20).

The soft real-time thread 504 may be a global positioning system (GPS) thread. If this thread 504 is not executed above some threshold frequency, users may experience less than ideal positioning on a GPS map. In other words, this thread 504 includes real-time aspects. However, the real-time aspects of the thread 504 are not considered critical. If this thread 504 is given a high priority (e.g., 20) due to being associated with the same virtual processor 404 as the hard real-time thread 502 (e.g., GSM thread), processor resources may be wasted, because this thread 504 may execute properly at some lower priority (e.g., 10). Accordingly, using the methods and apparatus for interleaving priorities described herein, the soft real-time thread 504 is given a midlevel effective priority 510 (e.g., 10).

The non-real-time thread 506 may be some miscellaneous thread that is not time critical. If this thread 506 is not executed above some threshold frequency, users may experience no perceivable detriment. If this thread 506 is given a high priority (e.g., 20) due to being associated with the same virtual processor 404 as the hard real-time thread 502 (e.g., GSM thread), processor resources may be wasted, because this thread 506 may execute properly at a much lower priority (e.g., 1). Accordingly, using the methods and apparatus for interleaving priorities described herein, the non-real-time thread 506 is given a low effective priority 512 (e.g., 1).

In this example, the second virtual processor 404 also includes a hard real-time thread 514 and a soft real-time thread 504. For example, the hard real-time thread 514 may be a time-critical thread such as handling a touch screen user interface. If this thread 514 is not executed above some threshold frequency, users may experience sluggish performance. Avoiding sluggish performance may be important, but not as important as avoiding dropped calls. Accordingly, the second virtual processor 404 is given midlevel priority (e.g., 15) to support this requirement.

The soft real-time thread 516 may be an audio player thread. If this thread 516 is not executed above some threshold frequency, users may experience less than ideal audio playback. In other words, this thread 516 includes real-time aspects. However, the real-time aspects of the thread 516 are not considered critical. If this thread 516 is given a midlevel priority (e.g., 10) due to being associated with the same virtual processor 404 as the hard real-time thread 514 (e.g., touch screen UI thread), processor resources may be wasted, because this thread 516 may execute properly at some lower priority (e.g., 5). Accordingly, using the methods and apparatus for interleaving priorities described herein, the soft real-time thread 516 is given a lower level effective priority 520 (e.g., 5).

Figure 6:
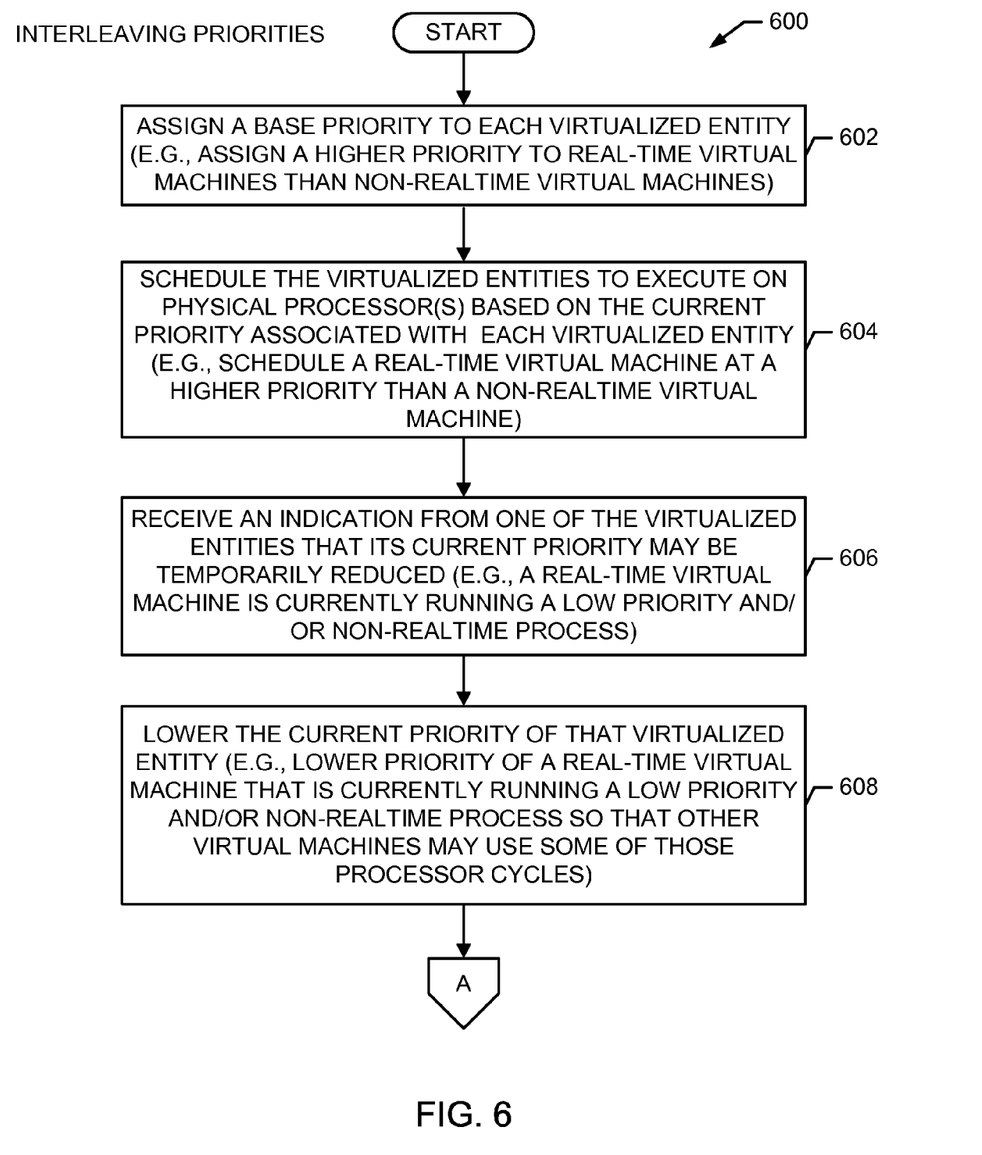
FIGS. 6-7 are a flowchart of an example process for interleaving priorities of a plurality of virtual processors.
Figure 7:
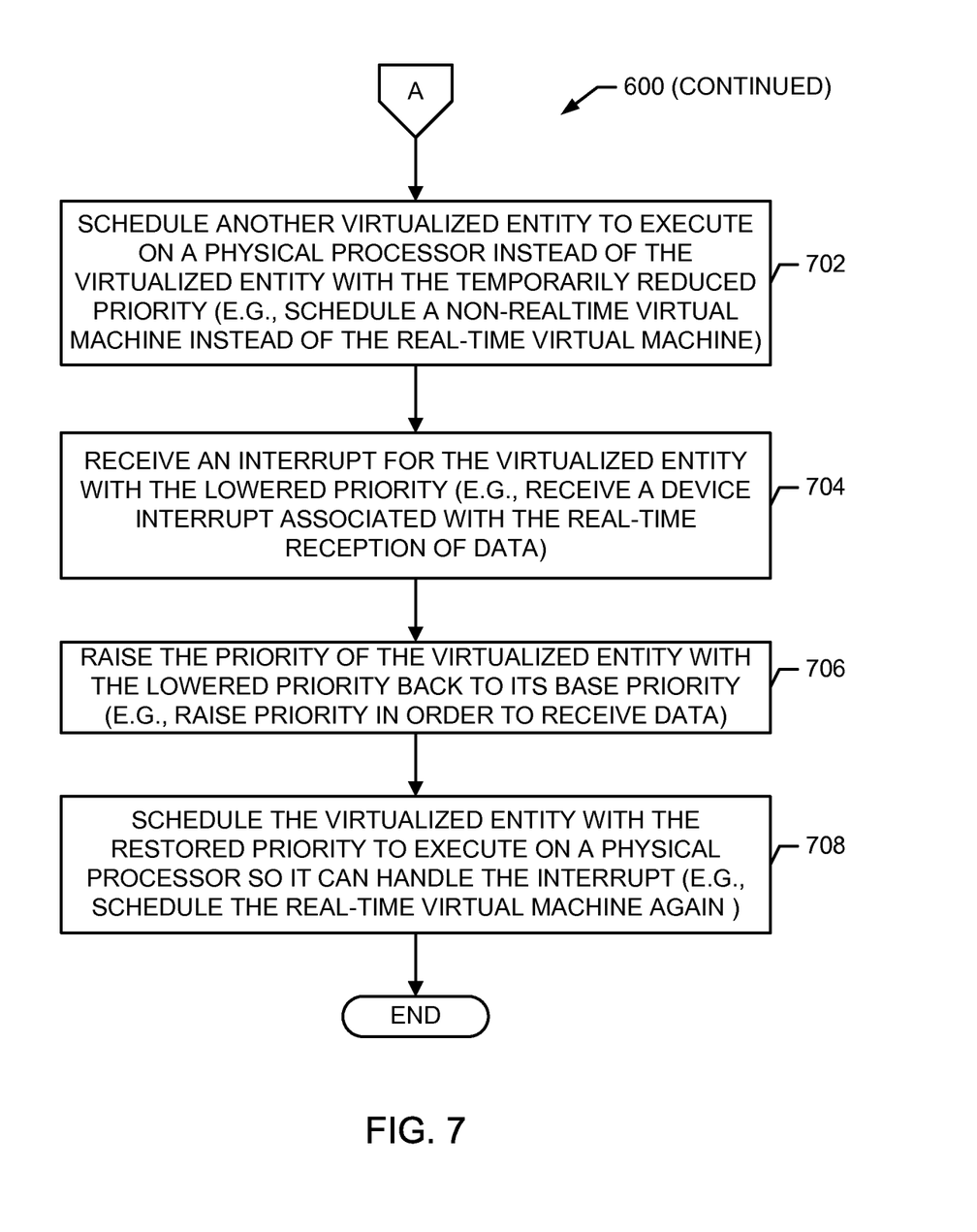

A flowchart of an example process 600 for interleaving priorities of a plurality of virtual processors is illustrated in FIGS. 6-7. The process 600 may be carried out by one or more suitably programmed processors such as a CPU executing software (e.g., block 204 of FIG. 2). The process 600 may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In general, a hypervisor 400 assigns a base priority to each virtual processor 404 and schedules one or more virtual processors 404 to execute on one or more physical processors 204 based on the current priority associated with each virtual processor 404. When the hypervisor 400 receives an indication from one of the virtual processors 404 that its current priority may be temporarily reduced, the hypervisor 400 lowers the current priority of that virtual processor 404. The hypervisor 400 then schedules another virtual processor 404 to execute on a physical processor 204 instead of the virtual processor 404 with the temporarily reduced priority. When the hypervisor 400 receives an interrupt for the virtual processor 404 with the lowered priority, the hypervisor 400 raises the priority of that virtual processor 404. If no higher priority virtual processor is already scheduled, the hypervisor 400 schedules the virtual processor 404 with the restored priority to execute on a physical processor 204 so that virtual processor 404 can handle the interrupt. In a virtual machine 402 containing a plurality virtual processors 404, threads may or may not be bound to a single virtual processor 404. However at any point in time, when a thread is scheduled to execute on a virtual processor 404, the virtual processor 404 can take on the priority of that thread.

More specifically, the example process 600 begins when a hypervisor 400 assigns a base priority to each virtualized entity (block 602). For example, the hypervisor 400 may assign a higher priority to real-time virtual machines than non-real-time virtual machines. The hypervisor 400 then schedules the virtualized entities to execute on physical processor(s) based on the current priority associated with each virtualized entity (block 604). For example, the hypervisor 400 may schedule a real-time virtual machine of a higher priority in preference to a non-real-time virtual machine with a lower priority.

The hypervisor 400 then receives an indication from one of the virtualized entities that its current priority may be temporarily reduced (block 606). For example, a real-time virtual machine may be currently running a low priority and/or non-real-time process. The hypervisor 400 then lowers the current priority of that virtualized entity (block 608). For example, the hypervisor 400 may lower the priority of a real-time virtual machine 402 that is currently running a low priority and/or non-real-time process, so that other virtual machines 402, which are now higher priority, can be scheduled. The hypervisor 400 may then schedule another virtualized entity to execute on a physical processor 204 instead of the virtualized entity with the temporarily reduced priority (block 702). For example, the hypervisor 400 may schedule a non-real-time virtual machine instead of the real-time virtual machine.

The hypervisor 400 then receives an interrupt for the virtualized entity with the lowered priority (block 7804). For example, the hypervisor 400 may receive a device interrupt associated with the real-time reception of data. The hypervisor 400 then raises the priority of the virtualized entity with the lowered priority back to its base priority (block 706). For example, the hypervisor 400 may raise the priority of a real-time virtual machine back to a high priority so that the real-time virtual machine can receive data. The hypervisor 400 then schedules the virtualized entity with the restored priority to execute on a physical processor 204 so it can handle the interrupt, which may cause a wakeup of its high priority thread. (block 708). Upon handling the interrupt, the virtual entity may determine a desired priority level and may send another indication to the hypervisor 400 that its priority may be temporarily reduced.

In summary, persons of ordinary skill in the art will readily appreciate that methods and apparatus for interleaving priorities of a plurality of virtual processors have been provided. Among other features, the methods and apparatus disclosed herein facilitate interleaving priorities of virtual processors despite the fact that the hypervisor is unaware of individual priorities associated with individual threads being executed within each virtual processor.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of interleaving priorities of a plurality of virtual processors, the method comprising:
   assigning a first maximum priority to a first virtual processor;
   assigning a second maximum priority to a second virtual processor, wherein the second maximum priority is lower than the first maximum priority;
   scheduling the first virtual processor to execute based on a first current priority associated with the first virtual processor being equal to the first maximum priority;
   receiving an indication from the first virtual processor that the first current priority associated with the first virtual processor may be temporarily reduced;
   lowering the first current priority associated with the first virtual processor to a temporary priority level, wherein the temporary priority level is lower than the second maximum priority;
   scheduling the second virtual processor to execute based on a second current priority associated with the second virtual processor being equal to the second maximum priority;
   receiving an interrupt associated with the first virtual processor;
   raising the first current priority associated with the first virtual processor to the first maximum priority in response to receiving the interrupt; and
   scheduling the first virtual processor to execute again based on the first current priority associated with the first virtual processor being equal to the first maximum priority.

2. The method of claim 1, further comprising receiving an interrupt threshold from the first virtual processor, the interrupt threshold being indicative of at least one interrupt level that will not cause the raising of the first current priority associated with the first virtual processor to the first maximum priority.

3. The method of claim 1, wherein lowering the first current priority associated with the first virtual processor includes lowering the first current priority associated with the first virtual processor to a lowest priority.

4. The method of claim 1, wherein scheduling the first virtual processor and the second virtual processor is performed by a hypervisor.

5. The method of claim 1, further comprising receiving an identifier indicative of a second virtual processor that the first virtual processor is waiting on.

6. An apparatus for interleaving priorities of a plurality of virtual processors, the apparatus comprising:
   a hypervisor; and
   at least one physical processor operatively coupled to the hypervisor;
   wherein the hypervisor is structured to:
      assign a first maximum priority to a first virtual processor;
      assign a second maximum priority to a second virtual processor, wherein the second maximum priority is lower than the first maximum priority;
      schedule the first virtual processor to execute based on a first current priority associated with the first virtual processor being equal to the first maximum priority;
      receive an indication from the first virtual processor that the first current priority associated with the first virtual processor may be temporarily reduced;
      lower the first current priority associated with the first virtual processor to a temporary priority level, wherein the temporary priority level is lower than the second maximum priority;
      schedule the second virtual processor to execute based on a second current priority associated with the second virtual processor being equal to the second maximum priority;
      receive an interrupt associated with the first virtual processor;
      raise the first current priority associated with the first virtual processor to the first maximum priority in response to the interrupt; and
      schedule the first virtual processor to execute again based on the first current priority associated with the first virtual processor being equal to the first maximum priority.

7. The apparatus of claim 6, wherein the hypervisor is structured to receive an interrupt threshold from the first virtual processor, the interrupt threshold being indicative of at least one interrupt level that will not cause the raising of the first current priority associated with the first virtual processor to the first maximum priority.

8. The apparatus of claim 6, wherein the hypervisor is structured to lower the first current priority associated with the first virtual processor to a lowest priority.

9. The apparatus of claim 6, wherein the hypervisor is structured to receive an identifier indicative of a second virtual processor that the first virtual processor is waiting on.

10. A computer readable memory storing instructions structured to cause an electronic device to:
    assign a first maximum priority to a first virtual processor;
    assign a second maximum priority to a second virtual processor, wherein the second maximum priority is lower than the first maximum priority;
    schedule the first virtual processor to execute based on a first current priority associated with the first virtual processor being equal to the first maximum priority;
    receive an indication from the first virtual processor that the first current priority associated with the first virtual processor may be temporarily reduced;
    lower the first current priority associated with the first virtual processor to a temporary priority level, wherein the temporary priority level is lower than the second maximum priority;
    schedule the second virtual processor to execute based on a second current priority associated with the second virtual processor being equal to the second maximum priority;
    receive an interrupt associated with the first virtual processor;

raise the first current priority associated with the first virtual processor to the first maximum priority in response to the interrupt; and schedule the first virtual processor to execute again based on the first current priority associated with the first virtual processor being equal to the first maximum priority.

11. The computer readable memory of claim 10, wherein the instructions are structured to cause the electronic device to receive an interrupt threshold from the first virtual processor, the interrupt threshold being indicative of at least one interrupt level that will not cause the raising of the first current priority associated with the first virtual processor to the first maximum priority.

12. The computer readable memory of claim 10, wherein the instructions are structured to cause the electronic device to lower the first current priority associated with the first virtual processor to a lowest priority.

13. The computer readable memory of claim 10, wherein the instructions are structured to cause the electronic device to schedule the first virtual processor and the second virtualized via a hypervisor.

14. The computer readable memory of claim 10, wherein the instructions are structured to cause the electronic device to receive an identifier indicative of a second virtual processor that the first virtual processor is waiting on.

15. A method of interleaving priorities of a plurality of virtual processors, the method comprising:

lowering a priority level of a first virtual processor to a first priority level in response to receiving an indication from the first virtual processor that the priority level may be lowered, the first priority level being lower than a second priority level of a second virtual processor; and raising the priority level of the first virtual processor in response to receiving an interrupt for the first virtual processor.

16. The method of claim 15, further comprising receiving an interrupt threshold from the first virtual processor, the interrupt threshold being indicative of at least one interrupt level that will not cause the raising of the priority level.

17. The method of claim 15, wherein raising the priority level includes raising the priority level to a base priority level previously assigned to the first virtual processor.

18. The method of claim 15, wherein lowering the priority level includes lowering the priority level to a lowest priority level.

19. The method of claim 15, wherein lowering the priority level and raising the priority level are each performed by a hypervisor.

20. The method of claim 15, further comprising receiving an indication that the first virtual processor is waiting on the second virtual processor.

21. The method of claim 15, further comprising scheduling the second virtual processor in response to lowering the priority level of the first virtual processor.

* * * * *